United States Patent
Morris et al.

(10) Patent No.: US 8,668,442 B2
(45) Date of Patent: Mar. 11, 2014

(54) TURBINE NOZZLES AND METHODS OF MANUFACTURING THE SAME

(75) Inventors: Mark C. Morris, Phoenix, AZ (US); Daniel Ryan, Phoenix, AZ (US); Donald G. Godfrey, Phoenix, AZ (US); Jason Smoke, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 834 days.

(21) Appl. No.: 12/827,702

(22) Filed: Jun. 30, 2010

(65) Prior Publication Data

US 2012/0003086 A1    Jan. 5, 2012

(51) Int. Cl.
*F01D 9/02* (2006.01)

(52) U.S. Cl.
USPC ........................................ 415/134; 415/209.3

(58) Field of Classification Search
USPC ........... 415/191, 137, 209.3, 209.4, 134, 135, 415/138, 200, 232; 416/223 R, 227 R, 203, 416/220 A, 231 R, 248
See application file for complete search history.

(56) References Cited

U.S. PATENT DOCUMENTS

| | | | | |
|---|---|---|---|---|
| 3,966,353 A * | 6/1976 | Booher et al. | | 415/115 |
| 4,040,159 A * | 8/1977 | Darrow et al. | | 29/889.721 |
| 4,384,822 A * | 5/1983 | Schweikl et al. | | 415/137 |
| 4,417,854 A * | 11/1983 | Cain et al. | | 416/241 B |
| 4,820,120 A * | 4/1989 | Feuvrier et al. | | 415/189 |
| 4,865,896 A * | 9/1989 | Yoshida et al. | | 428/116 |
| 5,129,783 A * | 7/1992 | Hayton | | 415/209.3 |
| 5,630,700 A * | 5/1997 | Olsen et al. | | 415/134 |
| 5,746,573 A * | 5/1998 | Junkin et al. | | 415/115 |
| 6,119,339 A | 9/2000 | Richter et al. | | |
| 6,269,540 B1 * | 8/2001 | Islam et al. | | 29/889.7 |
| 6,299,971 B1 * | 10/2001 | Maloney | | 428/312.8 |
| 8,292,580 B2 * | 10/2012 | Schiavo et al. | | 416/96 A |
| 2002/0127097 A1 * | 9/2002 | Darolia et al. | | 415/137 |
| 2005/0287002 A1 * | 12/2005 | Wells et al. | | 415/209.4 |
| 2007/0163114 A1 | 7/2007 | Johnson | | |
| 2008/0176092 A1 * | 7/2008 | Owens | | 428/542.8 |
| 2009/0162194 A1 * | 6/2009 | Savage | | 415/200 |

* cited by examiner

*Primary Examiner* — Nathaniel Wiehe
*Assistant Examiner* — Kayla McCaffrey
(74) *Attorney, Agent, or Firm* — Ingrassia Fisher & Lorenz, P.C.

(57) ABSTRACT

A turbine nozzle is provided and includes a first ring having a first microstructure, a vane extending from the first ring, a first porous zone between the first ring and the vane that is more porous than the first microstructure to attenuate thermo-mechanical fatigue cracking between the vane and the first ring. Methods of manufacturing the turbine nozzle are also provided.

19 Claims, 9 Drawing Sheets

US 8,668,442 B2

TURBINE NOZZLES AND METHODS OF MANUFACTURING THE SAME

TECHNICAL FIELD

The inventive subject matter generally relates to turbine engine components, and more particularly relates to turbine nozzles and methods of manufacturing turbine nozzles.

BACKGROUND

Gas turbine engines may be used to power various types of vehicles and systems, such as air or land-based vehicles. In typical gas turbine engines, compressed air generated by axial and/or radial compressors is mixed with fuel and burned, and the expanding hot combustion gases are directed along a flowpath and through a turbine nozzle having stationary turbine vanes. The gas flow deflects off of the vanes and impinges upon turbine blades of a turbine rotor. A rotatable turbine disk or wheel, from which the turbine blades extend, spins at high speeds to produce power. Gas turbine engines used in aircraft use the power to draw more air into the engine and to pass high velocity combustion gas out of the gas turbine aft end to produce a forward thrust. Other gas turbine engines may use the power to turn a propeller or an electrical generator.

Typically, the stationary turbine vanes of the turbine nozzle extend between an inner ring and an outer ring. The inner and outer rings define a portion of the flowpath along which the combustion gases travel. In some cases, to simplify manufacture of the turbine nozzle, the inner and/or outer rings are initially formed as segments, and the segments are subsequently assembled together to form a full ring or bonded together. In other cases, the vanes are bi-cast with the inner and outer rings, so that the rings and the vanes form a single, unitary structure.

Although the aforementioned turbine nozzles operate adequately under most circumstances, they may be improved. In particular, in configurations in which the inner and outer rings of the turbine nozzle comprise numerous segments, gas leakage may occur at interfaces between adjacent segments. As a result, a chargeable cooling flow may be unintentionally added to the gas flowing through the turbine nozzle, which may cause the turbine engine to increase fuel consumption. In some instances, leakage between the adjacent segments may result in decreased combustor cooling. Though bi-cast inner and outer rings reduce leakage of turbine nozzles, they may be relatively difficult and/or time consuming to manufacture. Additionally, coatings, such as thermal barrier layers, may be relatively difficult to apply to bi-cast turbine nozzles. In particular, because of limitations with deposition apparatus and processes for forming thermal barrier layers, formation of the thermal barrier layers on the stationary vanes may be a relatively complex process. In addition, bi-cast or brazed full ring turbine nozzles suffer from thermo-mechanical fatigue (TMF) due to the thermo-mechanical stresses that develop between the vanes and the inner ring and between the vanes and the outer ring.

Accordingly, it is desirable to have an improved turbine nozzle that has minimal gas leakage and is simpler and less expensive to manufacture than conventional turbine nozzles. In addition, it is desirable for the improved turbine nozzle to be capable of being retrofitted into existing engines. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Turbine nozzles and methods of manufacturing the turbine nozzles are provided.

In an embodiment, by way of example only, a turbine nozzle includes a first ring having a first microstructure, a vane extending from the first ring, a first porous zone between the first ring and the vane that is more porous than the first microstructure to attenuate thermo-mechanical fatigue cracking between the vane and the first ring.

In another embodiment, by way of example only, a method of manufacturing a turbine nozzle includes performing an additive manufacturing process to form a portion of the turbine nozzle having a first porosity zone and a second porosity zone, wherein the first porosity zone has a microstructure that is less porous than a microstructure of the second porosity zone.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter.

Furthermore, there is no intention to be bound by any theory presented in the preceding background or the following detailed description.

Generally, the inventive subject matter relates to improved turbine nozzles having at least a first ring having a first microstructure, a vane extending from the first ring, and a porous zone between the first ring and the vane that is more porous than the first microstructure. The porous zone can include a macroporous region, in an embodiment. In another embodiment, the porous zone can include a microporous region. In any case, inclusion of the porous zone is intended to attenuate thermo-mechanical fatigue cracking between the vane and the first ring by serving as a low stress compliant joint.

Figure 1:
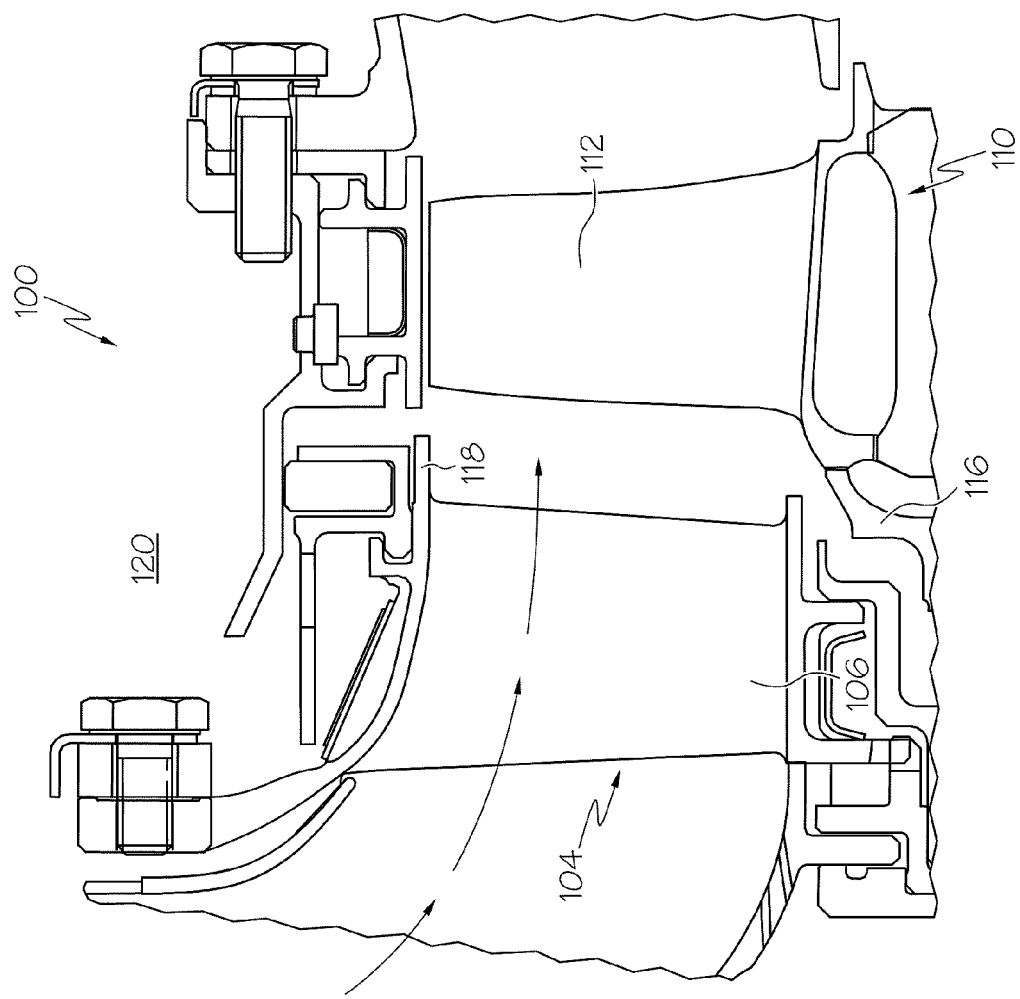
FIG. 1 is a cross-sectional side view of a turbine section of an engine, according to an embodiment.

An example of a system including the turbine nozzle is depicted in FIG. 1. FIG. 1 is a cross-sectional side view of a portion of a turbine section 100 of an engine, according to an embodiment. The turbine section 100 receives high temperature (e.g., a temperature typically in the range of 1100-1800° C.) gases from an upstream engine combustor (not shown) to produce energy for the engine and/or components coupled to the engine. The turbine section 100 includes a turbine nozzle 104 that has a plurality of static vanes 106 (only one of which is shown) that direct the gases from the combustor to a turbine 110. According to an embodiment, the turbine 110 includes a plurality of blades 112 (only one of which is shown) that are retained in axial position by a retention plate 116. When the blades 112 are impinged upon by the gases, the gases cause the turbine 110 to spin. According to an embodiment, an outer circumferential wall 118 surrounds the static vanes 106 and the plurality of blades 112 and defines a portion of a compressor plenum 120. The compressor plenum 120 receives bleed air from a compressor section (not shown), which may be directed through one or more openings in the outer circumferential wall 118 towards the plurality of blades 112 to cool the blades 112 and/or static vanes 106.

Figure 2:
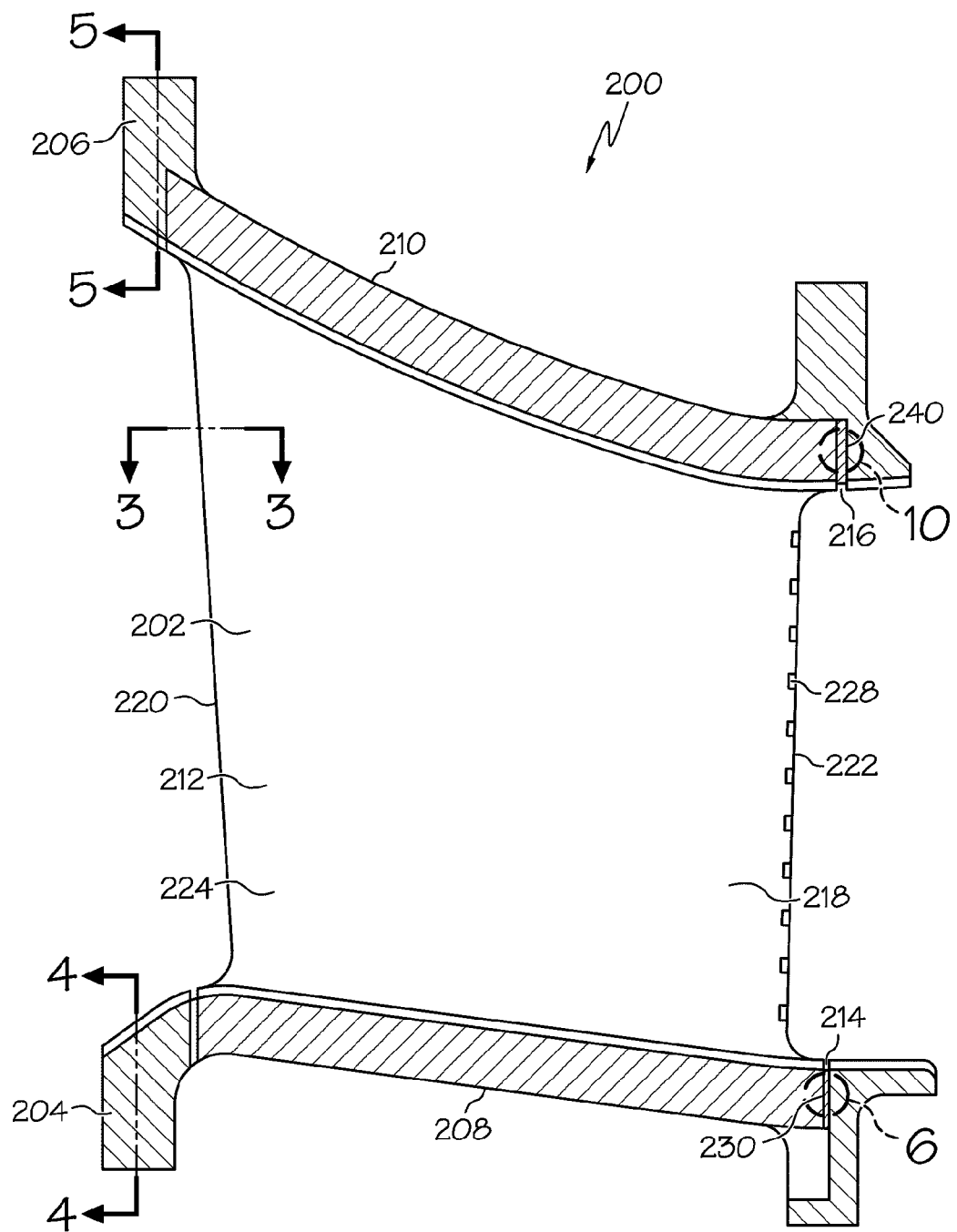
FIG. 2 is a cross-sectional side view of a portion of a turbine nozzle, according to an embodiment.

FIG. 2 is a cross-sectional side view of a portion of a turbine nozzle 200, according to an embodiment. The turbine nozzle 200 includes a plurality of static vanes 202 (only one of which is shown), a first ring 204, and a second ring 206. The vanes 202 extend between the rings 204, 206 and, as will be discussed in more detail below, form joints with the rings 204, 206. In an embodiment, the first ring 204 is disposed concentric to and radially inwardly from the second ring 206. However, in other embodiments, the second ring 206 alternatively may be disposed radially inwardly from the first ring 204. In an embodiment, the first ring 204 may have a diameter in a range of from about 5 cm to about 35 cm, and the second ring 206 may have a diameter in a range of from about 6 cm to about 50 cm. In another embodiment, the diameters of the rings 204, 206 may be greater or less than the aforementioned ranges.

Figure 3:
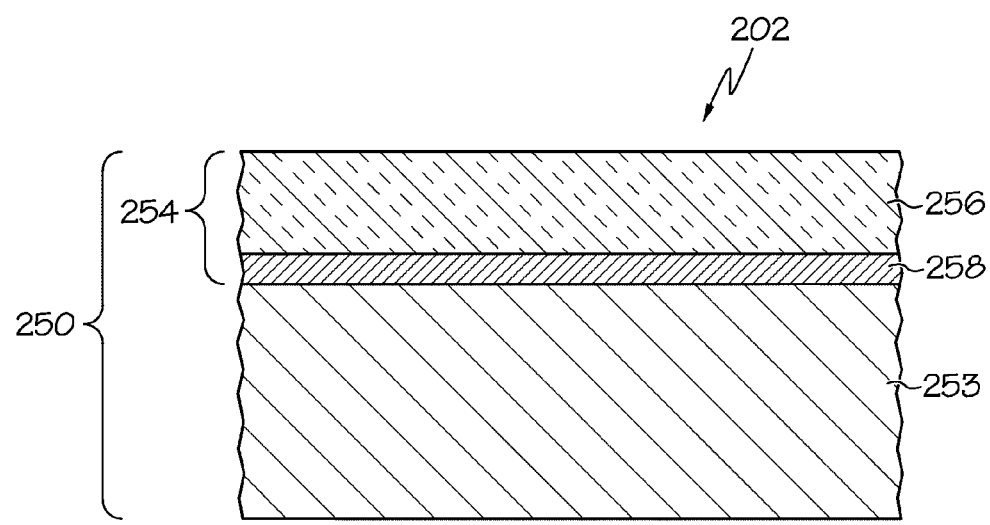
FIG. 3 is a simplified, close-up, cross-sectional view of a static vane taken along line 3-3 in FIG. 2, according to an embodiment.

FIG. 3 is a simplified, close-up, cross-sectional view of the static vane 202 taken along line 3-3 in FIG. 2, according to an embodiment. The static vane 202 comprises a parent material 250. In an embodiment, the parent material 250 may include a base material 253. For example, the base material 253 may comprise a metal alloy. In one embodiment, the base material 253 may include a nickel-based superalloy. Suitable nickel-based superalloys include, but are not limited to, INCO718, INCO738, and MAR-M-247EA. In other embodiments, the base material may comprise a different superalloy.

In accordance with an embodiment, the parent material 250 includes a protective coating 254 that is applied over the base material 253 and that is formulated to improve the useful life of the vanes 202. In an embodiment, the protective coating 254 may have a thickness in a range of from about 0.1 millimeters (mm) to about 0.5 mm. However, a particular thickness of the protective coating 254 may depend on a particular formulation and number of layers included in the protective coating 254, and thus, the protective coating 254 may be thicker or thinner than the aforementioned range. In an embodiment, the protective coating 254 may include a thermal barrier layer 256. Suitable materials for the thermal barrier layer 256 include, but are not limited to, a thermal-insulating ceramic material. For example, the thermal-insulating ceramic material may comprise a stabilized zirconia, such as yttria-stabilized zirconia (YSZ). In another embodiment, the thermal barrier layer may comprise cubic zirconia stabilized with about 15% to about 30% by weight yttria. In another embodiment, the thermal barrier layer 256 may comprise tetragonal zirconia stabilized with about 7% to about 8% by weight yttria. In still other embodiments, the thermal barrier layer may include stabilized hafnia and stabilized zirconia, and/or may comprise stabilizing oxides other than yttria, such as calcia, ceria, gadolinia, magnesia, neodymia, samaria, scandia, tantala, and ytterbia. In another embodiment, the protective coating 254 may include an environment-resistant or oxidation-resistant layer 258 and may comprise aluminide or platinum-aluminide. In yet other embodiments, the protective coating may additionally or alternatively include other layers.

Figure 4:
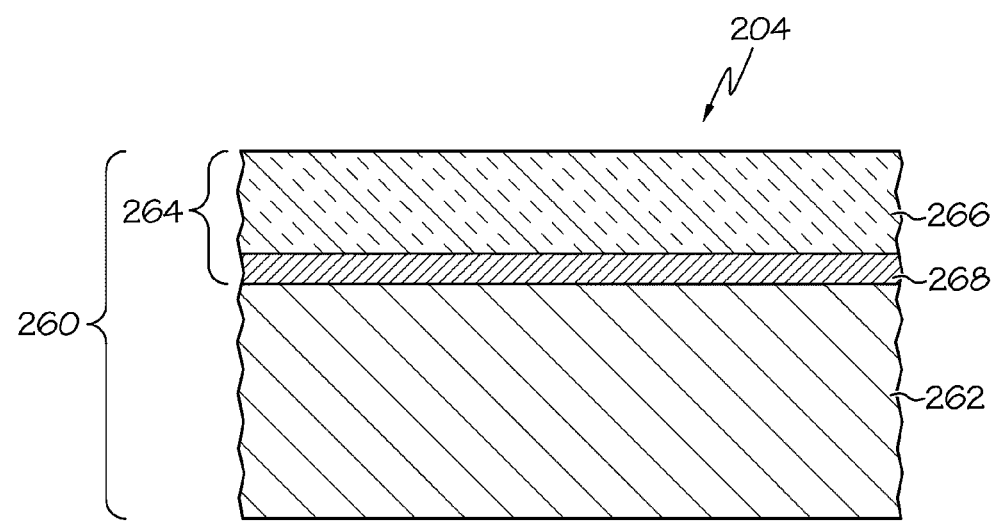
FIG. 4 is a simplified, close-up, cross-sectional view of a first ring taken along line 4-4 in FIG. 2, according to an embodiment.

FIG. 4 is a simplified, close-up, cross-sectional view of the first ring 204 taken along line 4-4 in FIG. 2, according to an embodiment. The first ring 204 may comprise a parent material 260. In an embodiment, the parent material 260 may include a base material 262, which may comprise a metal alloy. In one embodiment, the base material 262 may include material that is similar to the materials included for base material 253 of the vane 202 (FIG. 3). In another embodiment, the parent material 260 may include a protective coating 264 that may include a thermal barrier layer 266, an environment-resistant or oxidation-resistant layer 268, or another layer. The protective coating 264 may include materials similar to those used for protective coating 254 of the vane 202.

Figure 5:
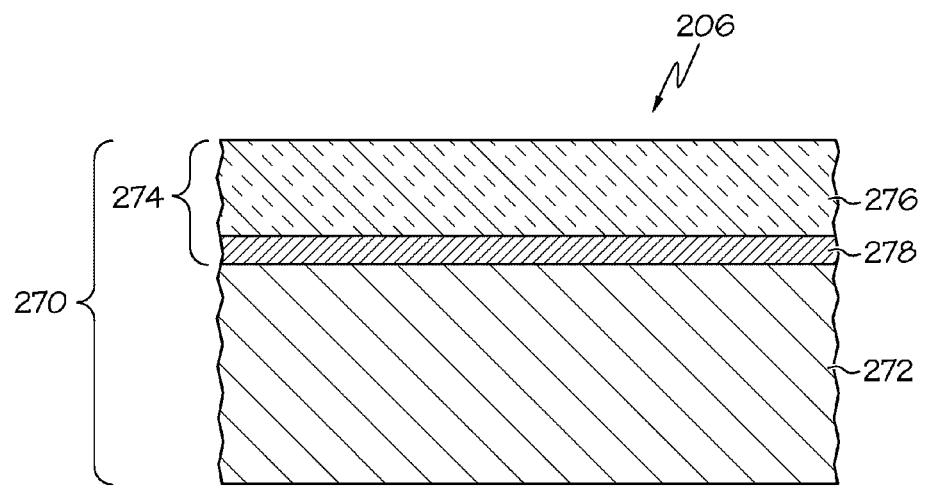
FIG. 5 is a simplified, close-up, cross-sectional view of a second ring taken along line 5-5 in FIG. 2, according to an embodiment.

FIG. 5 is a simplified, close-up, cross-sectional view of the second ring 206 taken along line 5-5 in FIG. 2, according to an embodiment. The second ring 206 may comprise a parent material 270. In an embodiment, the parent material 270 may include a base material 272, which may comprise a metal alloy. In one embodiment, the base material 272 may include material that is similar to the materials included for base material 253 of the vane 202 (FIG. 3) or base material 262 of the first ring 204 (FIG. 4). In another embodiment, the parent material 270 may include a protective coating 274 that may include a thermal barrier layer 276, an environment-resistant or oxidation-resistant layer 278, or another layer. The protective coating 274 may include materials similar to those used for protective coating 254 of the vane 202 or the protective coating 264 of the first ring 204.

Depending on a desired configuration, the vanes 202 and/or the rings 204, 206 may include substantially identical base materials. For example, the vanes 202 may include a base material that comprises a first metal alloy, and one or both of the rings 204, 206 may include a base material that includes a second metal alloy and/or a third metal alloy, where the metal alloys are substantially identical in formulation. In another embodiment, the metal alloys are not substantially identical in formulation. In other embodiments, the vanes 202 and/or the rings 204, 206 may include substantially identically formulated protective coatings. In yet other embodiments, the vanes 202 and/or rings 204, 206 may include one or more of the aforementioned layers that comprise the protective coating, and the layers may not be similar in formulation. In still other embodiments, the layers may be substantially identical in formation, but they may be deposited in different sequences or thicknesses.

Returning to FIG. 2, each vane 202 includes an airfoil 212, a first end 208, and a second end 210. The airfoil 212 has two outer walls 218 (only one of which is shown), each having outer surfaces that define an airfoil shape. The airfoil shape includes a leading edge 220, a trailing edge 222, a pressure side 224 along the first outer wall 218, a suction side along the second outer wall (not shown). In some embodiments, though not shown, the vane 202 may have an internal cooling circuit formed therein, which may extend from an opening in the first end 208 through the vane 202 and may include various passages that eventually communicate with trailing edge openings 228 or other openings (not shown) that may be formed in the vane 202.

Generally, the vane 202 and the rings 204, 206 are configured to have a fully densified microstructure. As used herein, the term "fully densified microstructure" is defined as a microstructure having a density of greater than or equal to 97%. To attenuate thermo-mechanical fatigue cracking between the vane 202 and the first ring 204, a first joint 230 located at an intersection of the vane 202 and the first ring 204 forms a low stress compliant joint. As used herein, the term "compliant joint" is defined as a structure joining two components, where the structure allows linear movement of the two components relative to each other. A "low stress compliant joint" is defined as a compliant joint that provides elastic, plastic or frictional resistance to relative movement between adjacent bodies (such as a vane 202 and first or second rings 204,206), while also allowing relative movement between adjacent bodies. This provision for relative movement between the adjacent bodies reduces stresses that would occur in the structure if the movement were not permitted. An example of such stresses is thermal stresses induced in nozzles due to the steady state and/or transient temperature gradients during engine operation which result in TMF.

Figure 6:
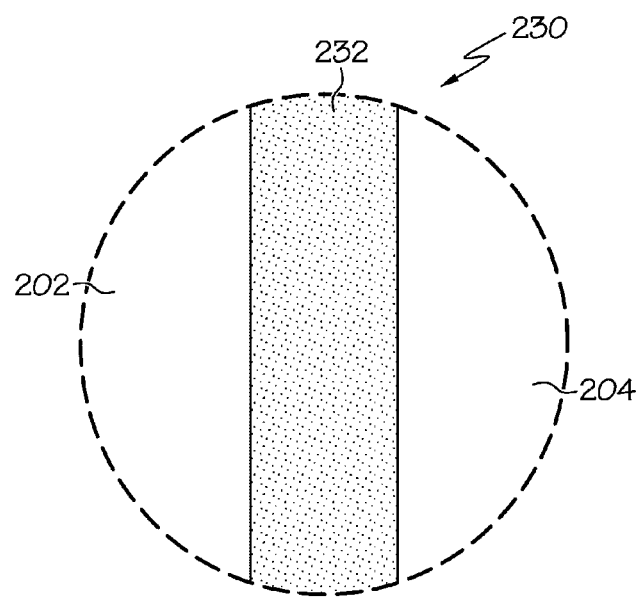
FIG. 6 is a simplified, close-up, cross-sectional view of a first joint indicated by dotted circle 6 in FIG. 2, according to an embodiment.

FIG. 6 is a simplified, close-up, cross-sectional view of the first joint 230 indicated by dotted circle 6 in FIG. 2, according to an embodiment. In an embodiment, the first joint 230 includes a porous zone 232. The porous zone 232 is an extension of the material of one or both of the vane 202 and/or first ring 204 having a porosity that is more porous than the fully densified microstructures of one or both of the vane 202 and/or first ring 204. Thus, the porous zone 232 comprises a material that is substantially identical to the parent material from which the vane 202 and/or first ring 204 comprise and from which the porous zone 232 extends. By providing a more porous zone, microcracking can be provided at the interface between the vane 202 and the first ring 204. The porous zone 232 has a thickness in a range of about 0.5 millimeters (mm) to about 5 mm, in an embodiment. In another embodiment, the porous zone 232 is thicker or thinner than the aforementioned thickness range.

In an embodiment, the porous zone 232 has a macroporous zone. As used herein, the term "macroporous" is defined as a predetermined lattice structure having an average percentage of a volume of voids (or open pores) over the total volume of the material comprising the porous zone 232 in a range of about 10% to about 85%. In another embodiment, the macroporous zone can be more or less porous than the aforementioned range. In any case, a particular pattern of the structure of the macroporous zone can be selected based on structural analysis and testing. For example, in an embodiment in which a compliant zone having the macroporous zone is utilized, the walls of the macroporous zone can form a honeycomb pattern, where the pores of the macroporous zone includes a square cross section. In another embodiment, the honeycomb pattern includes pores having a hexagonal cross section. In still another embodiment, the honeycomb pattern includes pores having a cross section of another polygonal shape. In another example, the walls of the macroporous zone comprise strands extending between the vane 202 to the first ring 204.

Figure 7:
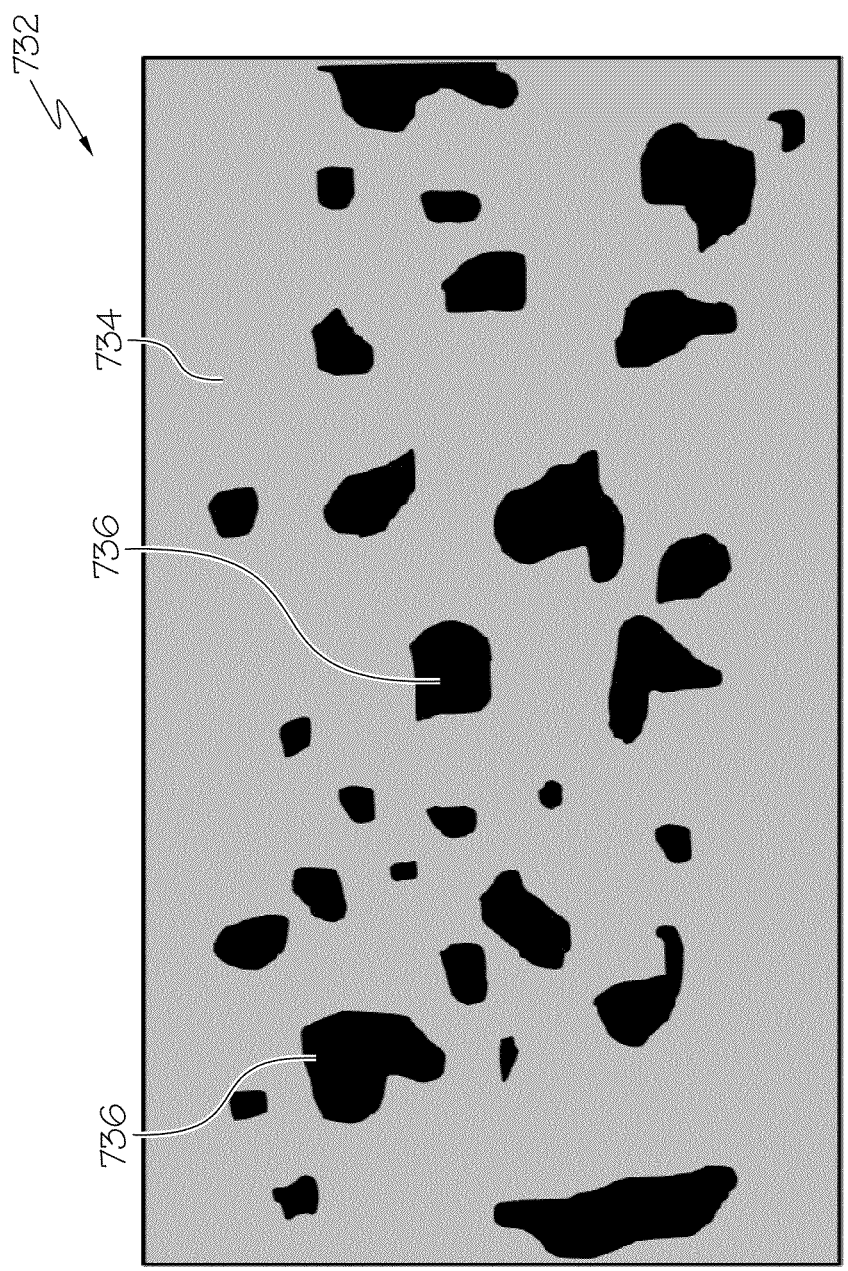
FIG. 7 is a simplified, close-up, cross-sectional view of a porous zone, according to an embodiment.

FIG. 7 is a simplified, close-up, cross-sectional view of a porous zone 732, according to another embodiment. Here, the porous zone 732 has a microporous microstructure. As used herein, the term "microporous" is defined as a structure having an average percentage of volume of voids 736 over the total volume of material 734 comprising the porous zone 732 in a range of about 10% to about 85% where the physical structure of the porosity of the microstructure is unknown until the structure is fully formed. In another embodiment, the microporous microstructure can be more or less porous than the aforementioned range. A particular pattern of the structure of microporous microstructure is random, in an embodiment.

Figure 8B:
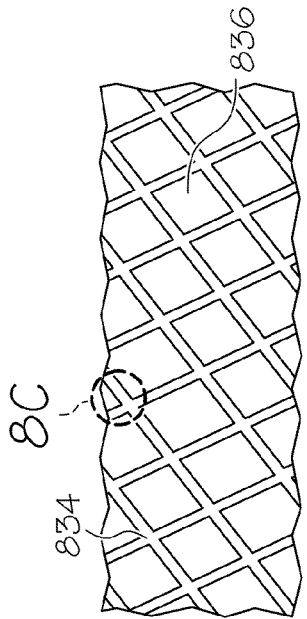
FIG. 8B is a close-up view of a portion of the porous zone of the first joint indicated by dotted circle 8B in FIG. 8A.
Figure 8C:
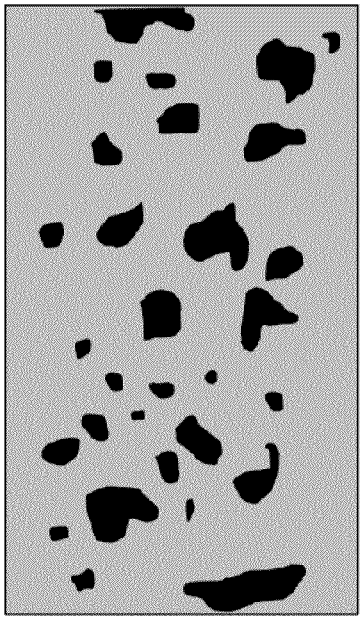
FIG. 8C is a close-up view of a portion of the porous zone of the first joint indicated by dotted circle 8C in FIG. 8B.
Figure 8A:
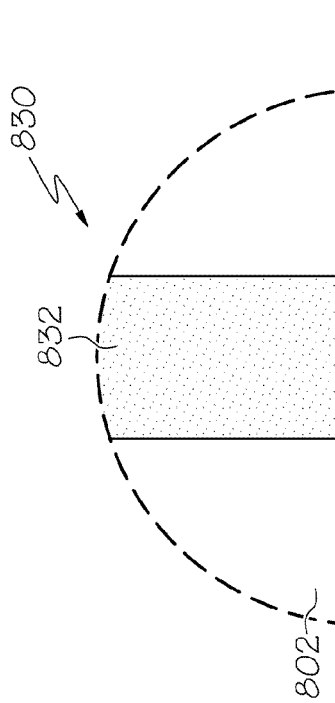
FIG. 8A is a simplified, close-up, cross-sectional view of a first joint and porous zone of the first joint, according to another embodiment.

FIG. 8A is a simplified, close-up, cross-sectional view of a first joint 830 incorporating a porous zone 832, according to still another embodiment. In the embodiment depicted in FIG. 8A, the first joint 830 includes a vane 802, a ring 804, and the porous zone 832 therebetween. The porous zone 832 includes both macroporous and microporous structures. With additional reference to FIG. 8B, the porous zone 832 is made up of walls 834 defining pores 836 that form a predetermined pattern, where the percentage of volume of the pores 836 over the total volume of the material falls within the range listed above for a macroporous structure. Additionally, as shown in FIG. 8C, the walls 834 have a microporous structure 838 such that a porosity of the walls 834 is in the microporous range mentioned above. The macroporous pattern formed by the walls 834 can be a honeycomb pattern, a plurality of strands or another pattern.

Figure 9:
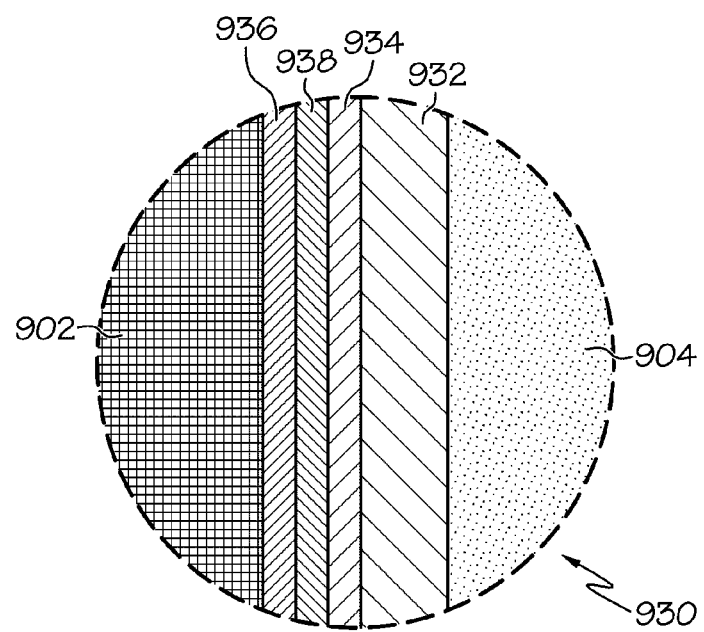
FIG. 9 is a simplified, close-up, cross-sectional view of a first joint, according to another embodiment.

FIG. 9 is a simplified, close-up, cross-sectional view of a first joint 930, according to another embodiment. Here, the first joint 930 includes a vane 902, a ring 904, a porous zone 932, and layers 934, 936, 938 therebetween. For example, an oxide layer 934 may be disposed over a surface of the first end of the vane 902, which may or may not include a protective coating (e.g., protective coating 254 of FIG. 3). In an embodiment, the oxide layer 934 is disposed over the porous zone 932. The oxide layer 934 may comprise aluminum, titanium, magnesium, or naturally forming oxides of elements found in the parent material (e.g., parent material 250 of FIG. 3) of the vane 902. In one embodiment, the oxide layer 934 is an intentionally oxidized portion of the parent material. In another embodiment, the oxide layer 934 may comprise a metal oxide or a braze stop-off material such as aluminum or titanium oxide that is deposited over a surface of the first end 208 of the vane 202 in FIG. 2. Suitable metal oxides include, but are not limited to aluminum oxide, titanium oxide, and magnesium oxide. The oxide layer 934 may have a thickness in a range of from about 0.002 mm to about 0.05 mm. In other embodiments, the thickness of the oxide layer 934 may be greater or less than the aforementioned range.

In another optional embodiment, the first joint 930 can further include a braze layer 936. The first braze layer 936 may be disposed over a surface of the first ring 904, which may or may not include a protective coating (e.g., protective coating 264 of FIG. 4), in an embodiment. According to an embodiment, the first braze layer 936 may include a braze alloy suitable for joining the parent material of the first ring 904 to the vane 902, while simultaneously filling the nozzle opening 214 (FIG. 2) to prevent gas leakage in first joint 930. When the first joint 930 is subjected to thermal expansion and contraction during engine operation, the bond is capable of inducing cracks at the oxide layer 934 at the first joint 930. Suitable braze alloys include, but are not limited to, AMS4777. The first braze layer 936 may have a thickness in a range of from about 0.01 mm to about 0.2 mm. In other embodiments, the thickness of the first braze layer 936 may be greater or less than the aforementioned range.

Although the first braze layer 936 is described as being disposed on the first ring 904 and the oxide layer 934 is described as being disposed on the vane 902, in other embodiments, the braze layer may be disposed on a vane and the oxide layer may be disposed on a ring.

No matter the particular surfaces on which the braze layer 936 and the oxide layers 934 are formed, bonding of the first braze layer 936 to the oxide layer 934 may be improved by including an adhesion layer 938 between the first braze layer 936 to the oxide layer 934. The adhesion layer 938 is adapted to bond the braze material of the first braze layer 936 to the oxide layer 934. Suitable materials from which the adhesion layer 938 may be formed may include, but are not limited to, nickel and alloys thereof. The adhesion layer 938 may have a thickness in a range of from about 0.002 mm to about 0.02 mm, in an embodiment. In other embodiments, the adhesion layer 238 may be thicker or thinner than the aforementioned range.

Figure 10:
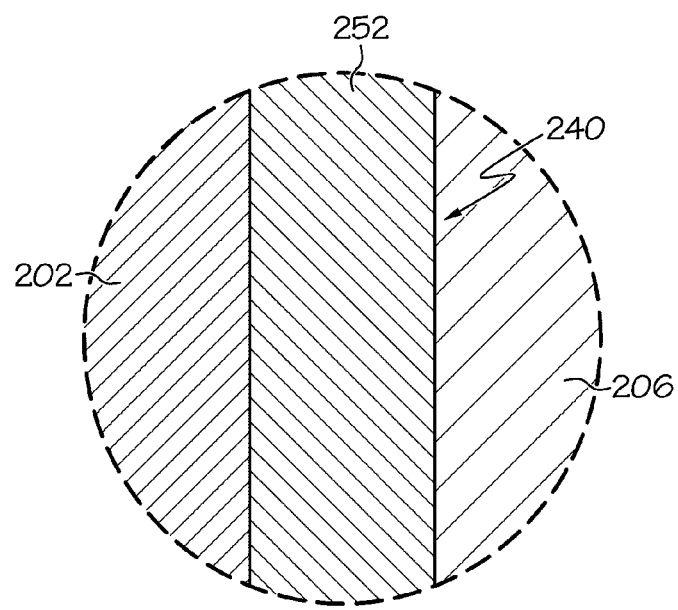
FIG. 10 is a simplified, close-up, cross-sectional view of a second joint, according to an embodiment.

Referring back to FIG. 2, the second end 210 of the vane 202 includes a second joint 240 between the vane 202 and the second ring 206. FIG. 10 is a simplified, close-up, cross-sectional view of the second joint 240 indicated by dotted circle 10 in FIG. 2, according to an embodiment. In an embodiment, the second joint 240 has a porous zone 252. The porous zone 252 is an extension of the material of one or both of the vane 202 and/or second ring 206 having a porosity that is more porous than the microstructures of one or both of the vane 202 and/or second ring 206. The porous zone 252 comprises a material that is substantially identical to the parent material from which the vane 202 and/or second ring 206 comprise and from which the porous zone 252 extends. By providing a more porous zone, microcracking can be provided at the interface between the vane 202 and the second ring 206. The porous zone 252 has a thickness in a range of about 0.5 millimeters (mm) to about 5 mm, in an embodiment. In another embodiment, the porous zone 232 is thicker or thinner than the aforementioned thickness range.

In an embodiment, the porous zone 252 has a macroporous zone. In another embodiment, the porous zone 252 has a microporous microstructure. In still another embodiment, the porous zone 252 has both microporous and macroporous zones. The porosity of the porous zone 252 in the second joint 240 may be substantially identical (e.g., ±0.5%) to that of the first joint 230. In accordance with another embodiment, the porous zone 252 is more or less porous than the porous zone 232 of the first joint 230.

Figure 11:
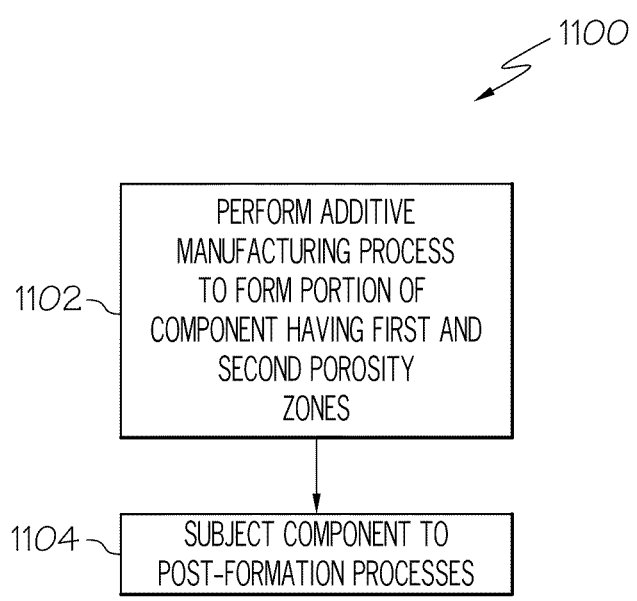
FIG. 11 is a flow diagram of a process for forming a component having different porosity zones, according to an embodiment.

FIG. 11 is a flow diagram of a process 1100 for forming a component having different porosity zones, according to an embodiment, may be employed. First, an additive manufacturing process is performed to form a portion of a component having a first porosity zone and a second porosity zone, step 1102. In an embodiment, the component is a turbine nozzle, such as the turbine nozzle 200 described above. In another embodiment, the component is a vane (e.g., vane 202). In still another embodiment, the component is another component in the engine 100, such as the turbine nozzle first ring 204 or second ring 206 or another structural component.

According to an embodiment, the corresponding section of the component to be fabricated may include or may be configured to be included as part of a joint between a vane and a ring of the nozzle. In such case, the corresponding section of the component to be fabricated is intended to be made up of sections including different porosities. For example, the corresponding section may include a first section having a first porosity and a second section having a second porosity. Specifically, the first porosity can be a microstructure having full densification to form a fully densified portion of the component, and the second porosity can be a microstructure that is more porous than the full densification to form a porous zone portion. In an embodiment, the second porosity is suitable for forming a macroporous zone. In another embodiment, the second porosity is suitable for forming a microporous microstructure. In still another embodiment, the second porosity is suitable for forming a microporous/macroporous zone.

As noted above, to form the different porosities in the nozzle, additive layer manufacturing processes are employed. Such processes include, but are not limited to, micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and provide the potential for innovative joining techniques.

In one particular exemplary embodiment, direct metal laser sintering (DMLS) is used as the additive layer manufacturing process. DMLS is a commercially available laser-based rapid prototyping and tooling process by which complex parts may be directly produced by precision melting and solidification of metal powder into successive layers of larger structures, each layer corresponding to a cross-sectional layer of the 3D component.

Figure 12:
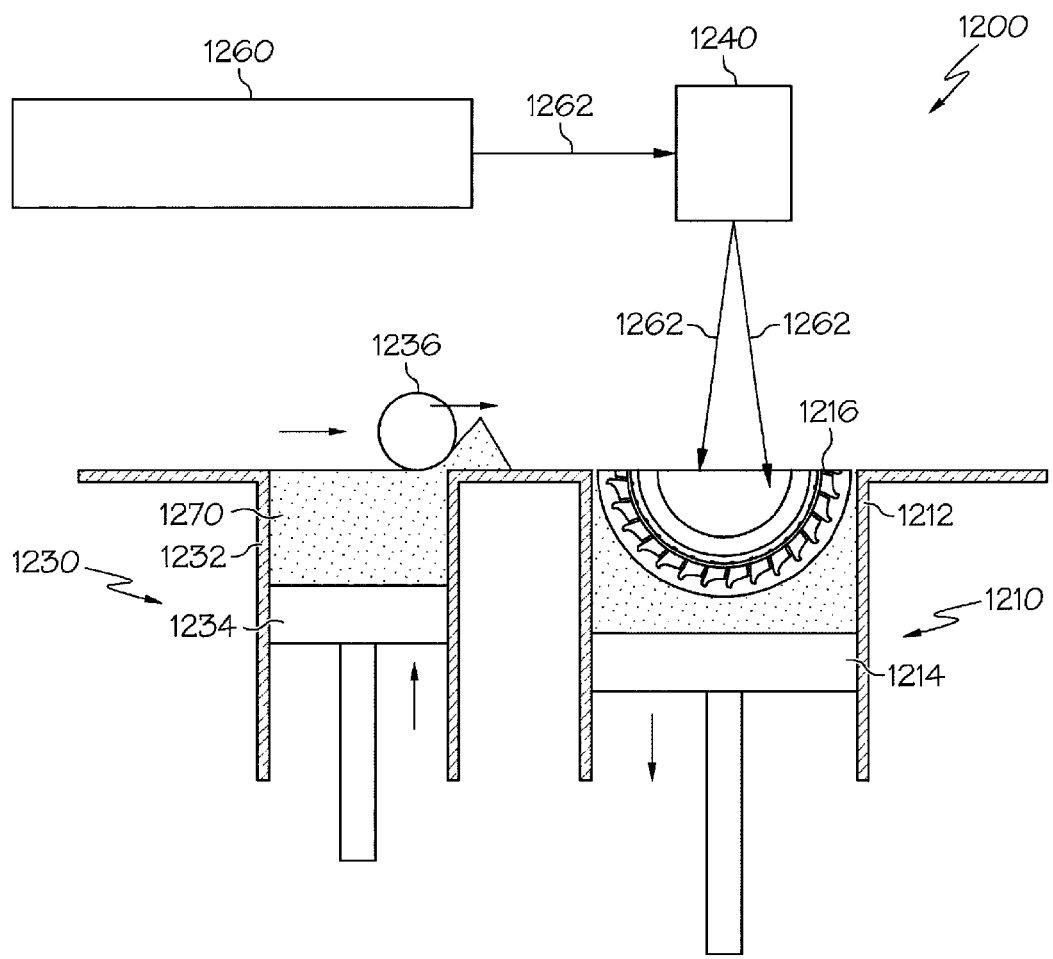
FIG. 12 is a simplified system for use in an additive layer manufacturing process, according to an embodiment.

FIG. 12 is a system 1200 for use in an additive layer manufacturing process, in accordance with an embodiment. The system 1200 is a DMLS system that includes a fabrication device 1210, a powder delivery device 1230, a scanner 1240, and a laser 1260 and functions to produce the turbine nozzle from build material 1270.

The fabrication device 1210 includes a build container 1212 with a fabrication support 1214 carrying the turbine nozzle to be formed from the build material 1270. The fabrication support 1214 is movable within the build container 1212 in a vertical direction and is adjusted in such a way to define a working plane 1216. The delivery device 1230 includes a powder chamber 1232 with a delivery support 1234 that supports the build material 1270 and is also movable in a vertical direction. The delivery device 1230 further includes a roller or wiper 1236 that transfers build material 1270 from the delivery device 1230 to the fabrication device 1210.

During operation, the fabrication support 1214 is lowered and the delivery support 1234 is raised. The roller or wiper 1236 scraps or otherwise pushes a portion of the build material 1270 from the delivery device 1230 to form the working plane 1216 in the fabrication device 1210. The laser 1260 emits a laser beam 1262, which is directed by the scanner 1240 onto the build material 1270 in the working plane 1216 to selectively fuse the build material 1270 into a cross-sectional layer of the turbine nozzle. More specifically, the laser beam 1262 selectively fuses the powder of the build material 1270 into larger structures by rapidly melting the powder particles. As the scanned laser beam 1262 moves on, heat is conducted away from the previously melted area, thereby leading to rapid cooling and resolidification. As such, based on the control of the laser beam 1262, each layer of build material 1270 will include unsintered build material 1270 and sintered build material that forms the cross-sectional layer of the turbine nozzle.

To form the different porosities in the desired portions of the turbine nozzle, the laser 1260 is provided with more than one initial set of manufacturing parameters. For example, the laser 1260 is provided with a first initial set of manufacturing parameters suitable for forming the fully densified portion and a second initial set of manufacturing parameters suitable for forming the porous zone portion. Further, the laser 1260 is programmed to adjust from the first initial set to the second initial set of manufacturing parameters or from the second set to the first initial set of manufacturing parameters to thereby form the fully densified and porous zone portions in the appropriate predetermined locations in the pattern. In still another embodiment, the first porosity is suitable for forming a macroporous, microporous, or microporous/macroporous zone, and the second porosity is suitable for forming a macroporous, microporous, or microporous/macroporous zone that is not the same as that of the first porosity.

In an embodiment, manufacturing parameters that are suitable for forming the fully densified portion include, but are not limited to a laser power in a range of about 50 watts to about 500 watts, laser spot diameter settings in a range of about 0.05 mm to about 1 mm, and scan speed settings in a range of about 0.2 m/s to about 2 m/s. Suitable manufacturing parameters to form the porous zone portion having a microporous microstructure include, but are not limited to a laser power density reduction in a range of about 25% to about 50% of the laser power density of that used for forming the fully densified portion. Suitable manufacturing parameters to form the porous zone portion having a microporous/macroporous zone include, but are not limited to a laser power density reduction in a range of about 25% to about 50% of the laser power of that used for forming the fully densified portion. The laser focal size or scan speed for forming both the fully densified and porous zone portions are identical, in an embodiment. In another embodiment, the focal size or scan speed are different and are selected to achieve a partial melting (sintered, but not fully melted) microstructure in the porous zone portion.

The build material 1270 may be formed by any suitable powder, including metal powders, such as a stainless steel powder, and alloys and super alloy materials, such as nickel-based or cobalt superalloys. In one exemplary embodiment, the build material 1270 is a high temperature nickel base super alloy such as MAR-M-247. In other embodiments, IN718 or IN738 or other suitable alloys may be employed. The powder build material 1270 may be selected for enhanced strength, durability, and useful life, particularly at high temperatures. Each successive layer may be, for example, between 10 μm and 200 μm, although the thickness may be selected based on any number of parameters.

Upon completion of a respective layer, the fabrication support 1214 is lowered and the delivery support 1234 is raised. The roller or wiper 1236 again pushes a portion of the build material 1270 from the delivery device 1230 to form an additional layer of build material 1270 on the working plane 1216 of the fabrication device 1210. The laser beam 1262 is again controlled to selectively form another cross-sectional layer of the turbine nozzle. This process is continued as successive cross-sectional layers are built into the turbine nozzle. When the laser sintering process is completed, the unsintered build material 1270 is removed and the turbine nozzle is removed from the fabrication device 1210 in anticipation of the subsequent steps discussed below. Although the DMLS process is described herein, other suitable additive manufacturing processes may be employed to fabricate the turbine nozzle.

Returning to FIG. 11, the component is subjected to post-formation processes, step 1104. In one embodiment, the post-formation process includes subjecting the component to a heat treatment. The heat treatment may be employed to improve the high temperature creep strength properties of the resulting nickel-base superalloy component. For example, the heat treatment may include a partial gamma prime solution heat treatment step and a gamma-prime precipitation heat treatment step or steps, which may be used to develop a two-phase gamma-gamma prime microstructure. In another example, post-formation processes may include machining, coating, or heat treatments.

In another example of step 1104, the component is subjected to a coating process. In an embodiment, one or more coatings may be formed over the component. The coatings may include bond coatings and/or other types of oxidation-resistant, environmental-resistant or other types of coatings. The coated resulting component may additionally undergo a heat treatment. In another example, the resulting component may undergo a machining process to alter a portion of its outer surface.

In still another embodiment of step 1104, the component formed by the additive manufacturing process is a vane or a ring including openings for receiving a vane, and the component is subjected to coating and/or brazing. For example, an oxide layer is imparted onto desired surfaces of the component. According to an embodiment, the oxide layer is included for forming a compliant joint between the vane and the ring, and thus, the desired surface is a surface on either the vane or the ring which will form the compliant joint with a corresponding surface. In an example, the compliant joint may be formed between a vane and the ring intended to serve as an inner ring of the turbine nozzle; hence, the oxide layer may be imparted onto a surface of the vane that will be inserted into a corresponding opening formed in the ring. In another example, the compliant joint may be formed between a vane and the ring intended to serve as an outer ring of the turbine nozzle; hence, the oxide layer may be imparted onto a surface of the vane that will be inserted into a corresponding opening formed in the ring or on a surface of the ring defining the opening. In some embodiments, compliant joints may be formed between both the inner and outer rings and the vanes. However, in other embodiments, compliant joints may be formed only between the vanes and the inner ring or only between the vanes and the outer ring. The oxide layer may be imparted to the fully densified portion and/or the porous zone of the component.

The oxide layer may be a layer of material deposited over a desired surface of the parent material of the vane or ring, in an embodiment. In another embodiment, the oxide layer may be an intentionally oxidized portion of the desired surface of the parent material of the vane or ring. In this regard, the oxide layer may be formed using a variety of processing. In one embodiment, the oxide layer may be imparted to the desired surface by utilizing an electro-discharge machining ("EDM") operation. For instance, the EDM operation may include forming a recast layer, which involves producing an electrical discharge having a temperature in a range of from about 10,000° C. to about 30,000° C. to melt the desired surface of the vane or ring thereby forming the recast layer. The recast layer may have a thickness in a range of from about 0.005 mm to about 0.06 mm. In other embodiments, the recast layer may be thicker or thinner than the aforementioned range.

In another example, the oxide layer may be deposited over the desired surface using known techniques, such as plasma spray, cold-gas spray, electron-beam physical vapor deposition, chemical vapor deposition, and the like. In other embodiments, the layers may be deposited using a different process. In an embodiment, the oxide layer may comprise a metal oxide, such as aluminum oxide, titanium oxide, magnesium oxide, naturally occurring oxides of elements of the parent material, or another metal oxide. In another embodiment, the oxide layer may be a braze stop-off material, such as is commercially available such as Nicrobraz® stop-off from the Alloy Products Group at the Wall Colmonoy Corporation of Madison Heights, Mich. According to an embodiment, the deposited oxide layer may be deposited to a thickness in a range of from about 0.01 mm to about 0.2 mm. In other embodiments, the thickness may be greater or less than the aforementioned range. In yet another example, the oxide layer may be formed on the desired surface by subjecting the desired surface to an oxidation process.

After oxide layers are imparted to selected ones of the vanes and/or rings for forming a compliant joint, the vanes and rings are assembled into a turbine nozzle assembly. In an embodiment, first ends of the vanes are inserted into corresponding first openings in the first ring, and second ends of the vanes are inserted into corresponding second openings in the second ring. Consequently, the vanes extend radially outwardly from the first ring to the second ring, when the first ring is configured to serve as the inner ring. To maintain the vanes and rings in position relative to each other, a suitable assembly fixture may be employed. According to an embodiment, calibration gauges may be employed to determine accuracy of positioning of the blades relative to the rings. In another embodiment, surfaces of the vanes and the rings to be joined may be tack welded together to temporarily hold the turbine nozzle assembly together.

Braze materials are then applied to the joints of the assembly. In accordance with an embodiment, a first braze material is applied to the first joint formed between the first end of the vane and the first ring, and a second braze material is applied to the second joint formed between the second end of the vane and the second ring. In an embodiment, the first and second braze materials may be substantially identical in formulation. In another embodiment, the first and second braze materials may be different formulations. The first and second braze materials may comprise a material similar to the braze material mentioned above for forming the first and/or second braze layers. In other embodiments, different braze materials may be employed. In any case, the first and second braze materials may be applied as a paste, as a liquid, as a foil, a powder, or in another conventional form. In an embodiment in which the first and second braze materials are applied as a paste or a liquid, beads of the braze materials may be placed in or adjacent to gaps that may be formed between the ends of the vanes inserted in the openings of the first and second rings. In an embodiment in which the braze materials are applied as a foil, the foil may be disposed over the first and second ends of the vane adjacent to or at least partially in the gaps formed between the vanes and the rings.

After the braze materials are applied, the turbine nozzle assembly is subjected to a heat treatment to transform the first braze material at the first joint into a compliant joint and to transform the second braze material at the second joint into a bonded or compliant joint. According to an embodiment, the heat treatment may include heating the turbine nozzle assembly to a temperature that is above a melting temperature of the braze material. In an example, the turbine nozzle assembly may be placed in an autoclave or other oven, which is heated to the temperature. Alternatively, localized heat may be supplied to particular areas of the turbine nozzle assembly via an apparatus such as a hand held laser, and the like. The temperature employed during the heat treatment may be in a range of from about 850° C. to about 1300° C., in an embodiment. However, in other embodiments, the temperature may be greater or less, depending on a melting temperature of the particular braze materials employed.

By including porous zones between fully densified microstructures of a vane and ring, cracking, which may occur as a result of thermal expansion and contraction during turbine engine operation, is controlled. In particular, cracking is limited to preferential locations on the turbine nozzle in the vicinity of the porous zones. Additionally, the compliant joints allow rings to be integrally manufactured, such as by additive manufacturing processes, to thereby improve fuel efficiency of a turbine engine. In particular, fewer segments may make up the turbine nozzle, which reduces a likelihood of gas leakage as gases flow through the turbine nozzle. The aforementioned steps of the methods for forming the turbine nozzle may be wholly employed, or alternatively, may be employed in part. For example, in some embodiments in which a damaged turbine nozzle may include one or more damaged vanes, the damaged vanes may be removed by EDM or another machining process, and new vanes formed by processes described above may be incorporated into the turbine nozzle.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbine nozzle, comprising:
a first ring having a first microstructure in at least a section thereof;
a vane extending from the first ring;
wherein one or both of the first ring and the vane have a first porous zone at the interface therebetween, the first porous zone being an extension of, and comprised of substantially identical material as a parent material of, one or both of the first ring and the vane, the first porous zone being more porous than the first microstructure to attenuate thermo-mechanical fatigue cracking between the vane and the first ring.

2. The turbine nozzle of claim 1, wherein:
the first porous zone comprises a macroporous zone, wherein the macroporous zone comprises a predetermined lattice structure having an average percentage of a volume of voids over a total volume of material comprising the first porous zone in a range of about 10% to about 85%.

3. The turbine nozzle of claim 2, wherein:
the macroporous zone comprises a honeycomb pattern.

4. The turbine nozzle of claim 2, wherein:
the macroporous zone comprises a plurality of strands.

5. The turbine nozzle of claim 1, wherein:
the first porous zone comprises a microporous microstructure, wherein the microporous microstructure has an average percentage of a volume of voids over the total volume of material comprising the first porous zone in a range of about 10% to about 85%.

6. The turbine nozzle of claim 1, wherein:
the first microstructure comprises a fully densified microstructure; and
the first porous zone is more porous than the fully densified microstructure.

7. The turbine nozzle of claim 1, further comprising:
a second ring having a second microstructure, the vane extending between the first ring and the second ring; and
a second porous zone that is more porous than the second microstructure to thereby attenuate thermo-mechanical fatigue cracking between the vane and the second ring.

8. A method of manufacturing a turbine component comprising:
performing an additive manufacturing process to form a portion of the turbine component having a first porosity zone and a second porosity zone, wherein the first porosity zone has a microstructure that is less porous than a microstructure of the second porosity zone, the portion of the turbine component having the second porosity zone being an extension of, and comprised of substantially identical material as a parent material of, the portion of the turbine component having the first porosity zone.

9. The method of claim 8, wherein the first porosity zone comprises a fully densified microstructure, and the second porosity zone comprises a macroporous zone.

10. The method of claim 8, wherein the first porosity zone comprises a fully densified microstructure, and the second porosity zone comprises a microporous microstructure.

11. The method of claim 10, wherein the second porosity zone further comprises a macroporous zone.

12. The method of claim 8, wherein the step of performing comprises:
defining a three-dimensional model of the turbine component; and
converting the three-dimensional model to a plurality of slices that each define a cross-sectional layer of the turbine component.

13. The method of claim 12, wherein the performing step includes using a high energy density beam, the high energy density beam including at least one of a laser beam, an electron beam, a plasma jet, or an electric arc.

14. The method of claim 13, wherein the step of performing includes one of sintering or melting a powdered metal to form the turbine component in successive layers.

15. The method of claim 8, wherein the first porosity zone and the second porosity zone form a compliant joint.

16. The method of claim 15, further comprising forming a braze layer over a surface of the turbine component for forming the compliant joint.

17. The method of claim 15, further comprising forming an oxide layer over a surface of the turbine component for forming the compliant joint.

18. A turbine nozzle, comprising:
a first ring having a first microstructure;
a vane extending from the first ring; and
a first porous zone between the first ring and the vane that is more porous than the first microstructure to attenuate thermo-mechanical fatigue cracking between the vane and the first ring, wherein a braze layer is disposed over the first porous zone and between the first porous zone and the first ring.

19. The turbine nozzle of claim 18, further comprising an oxide layer between the braze layer and the first porous zone.

* * * * *